Dec. 1, 1931.     F. W. WOODFIN     1,834,817
AUTOMOBILE SEAT
Filed Nov. 1, 1929
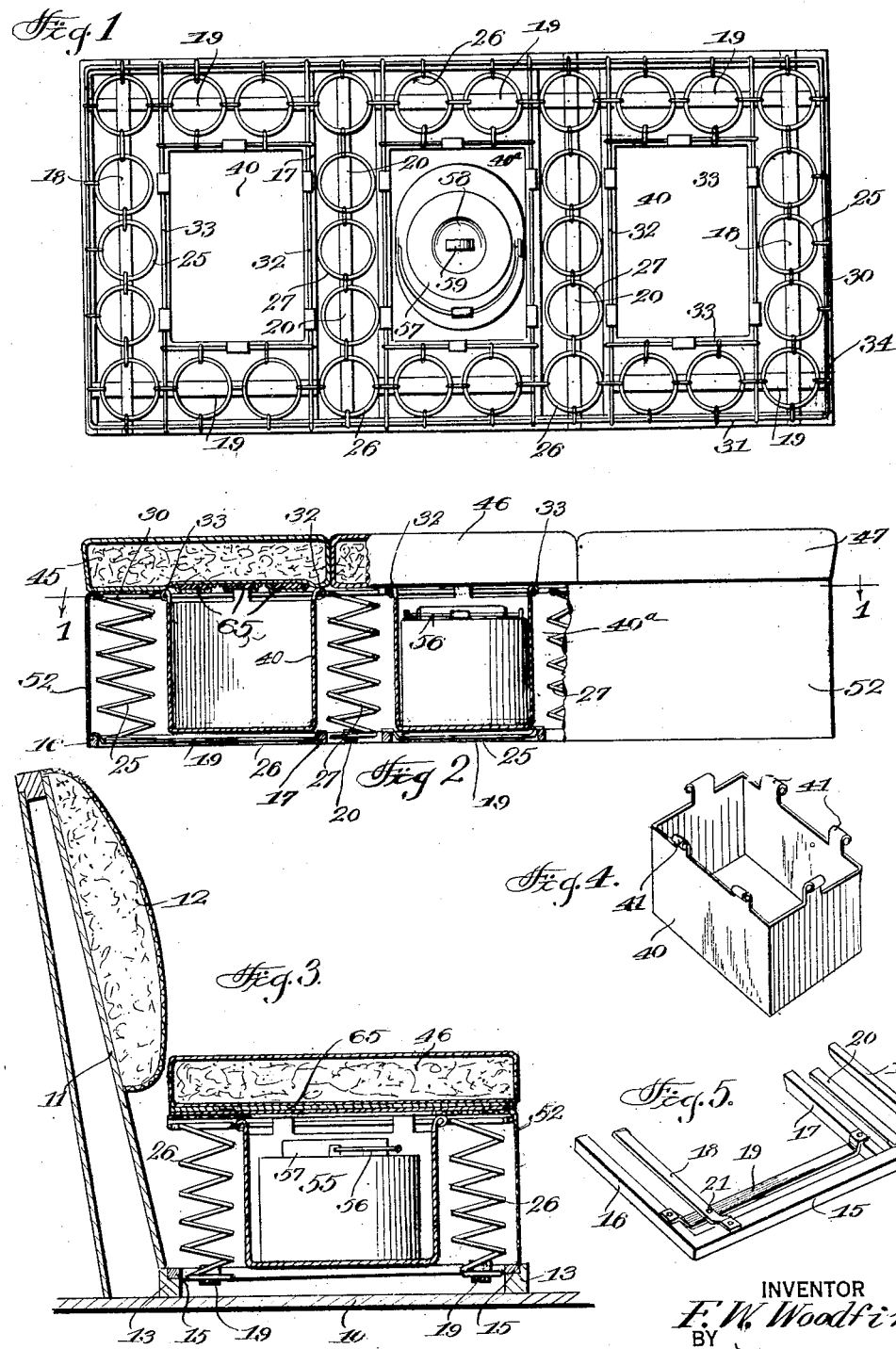
INVENTOR
F. W. Woodfin
BY
ATTORNEY Patented Dec. 1, 1931

1,834,817

UNITED STATES PATENT OFFICE

FRANK WAYLAND WOODFIN, OF ALCOA, TENNESSEE

AUTOMOBILE SEAT

Application filed November 1, 1929. Serial No. 404,159.

This invention relates to automobile seats.

An object of the invention is the provision of a seat which includes a plurality of frames maintained in spaced relation by the usual coil springs with casings suspended from one of the frames providing compartments for the storage of articles.

A further object of the invention is the provision of an automobile seat which includes a base frame and a top frame spaced from each other with the top frame being supported from the base frame by means of the usual coil springs so arranged as to provide spaces for the reception of casings forming compartments, the casings being inserted through openings in the top frame and supported thereby, cushions forming part of the seat being employed as covers for the various compartments.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of a seat constructed in accordance with the principles of my invention with the cushions removed, Figure 2 is a front view of the seat with parts broken away, Figure 3 is a transverse vertical section through one of the compartments, Figure 4 is a view in perspective of the casing forming one of the compartments, and Figure 5 is a view in perspective of a base frame.

Referring more particularly to the drawings 10 designates the floor of an automobile from which rises at an acute angle a support 11 carrying a back cushion 12 of a rear seat. Blocks 13 extend transversely of the floor and are secured thereto in any approved manner.

A base frame is carried by the blocks 13 and consists of side bars 15 and end bars 16. Intermediate bars 17 run transversely of the base frame and are connected in any approved manner to the side bars 15. Straps 18 are connected to the upper surfaces of the side bars 15 and are depressed sufficiently below the top of said side bars. The strap 19 is secured at 21 to the strap 18 and is likewise offset from the plane passing through the top of the end and side walls. Springs 25 are secured in any approved manner, such as by welding, to the straps 18 while springs 26 are secured to the spaced straps 19. Springs 27 are secured to the straps 20 and extend upwardly.

A space is retained between the strap 18 and the intermediate bar 17 and the spaced straps 19 for a purpose which will be presently explained.

A wire frame is provided and constitutes the top frame which is spaced from the base frame by means of the coil springs and retained in that position. This frame consists of end rods 30, side rods 31 and pairs of intermediately disposed rods 32 and 33. The springs are connected by means of links 34 to rods which are located adjacent the upper end of the springs whereby the springs are held against displacement.

A casing 40 forming individual compartments within the body of the seat is substantially rectangular in shape and open at its upper end. The metal of the side and end walls is extended to form ears 41 which are bent to embrace the rods 33 and 32 whereby the casings are suspended from the top frames. The rods 32 and 33 are so spaced from each other in pairs that they form an opening to neatly receive the casings 40. From this construction it will be noted that any pressure exerted upon the top frame will not be extended to the casings 40 since these casings will move downwardly towards the base frame upon the compression of the springs. The casings will in no way interfere with the cushioning effect of the springs or the usual operation of the seat.

Three cushions 45, 46 and 47 are supported upon the top frame and are constructed in the usual manner.

The cushions are each provided with steel ribs 65 in the bottom portions thereof with the ribs spanning the openings over the casings to prevent said cushions from sagging at these points. The ends of the ribs or stays rest on the adjacent frame work.

The central compartment 40$^a$ may be supplied with a container 55 having a handle 56 secured to the top portion. A cover 57 closes the top of the container and is provided with a depressed portion 58 in which is mounted a handle 59 for removing the cover. The container may be employed as a commode.

The two end compartments may be employed for storage purposes.

I claim:

1. An automobile seat comprising a base frame, a top frame, springs supporting the top frame from the base frame, a plurality of storage casings suspended from the top frame and terminating short of the base frame, and a cushion forming a cover for the casing and carried by the top frame.

2. An automobile seat comprising a base frame, a top frame spaced from the base frame and having openings, storage casings received by the openings and suspended by the top frame and terminating short of the base frame, and springs embracing the casings and connected to the top and base frames.

3. An automobile seat comprising a base frame, a top frame spaced from the base frame and having openings, storage casings received by the openings and provided with ears at the upper ends thereof, said ears being connected to the top frame for suspending the casings from the top frame, and springs embracing the casings and connected to the top and base frames, said casings terminating short of the base frame.

FRANK W. WOODFIN.